US007715988B2

(12) United States Patent
Robertsson et al.

(10) Patent No.: US 7,715,988 B2
(45) Date of Patent: May 11, 2010

(54) INTERPOLATING AND DEGHOSTING MULTI-COMPONENT SEISMIC SENSOR DATA (75) Inventors: Johan Olof Anders Robertsson, Oslo (NO); Philippe Caprioli, Hosle (NO); Ahmet Kemal Ozdemir, Asker (NO)

(73) Assignee: WesternGeco L.L.C., Houston, TX (US)

( * ) Notice: Subject to any disclaimer, the term of this patent is extended or adjusted under 35 U.S.C. 154(b) by 228 days.

(21) Appl. No.: 11/762,509

(22) Filed: Jun. 13, 2007

(65) Prior Publication Data
US 2008/0312878 A1 Dec. 18, 2008

(51) Int. Cl.
*G06F 19/00* (2006.01)
*G01V 1/38* (2006.01)
(52) U.S. Cl. .................................. 702/17; 367/21
(58) Field of Classification Search .......... 702/17, 702/18; 367/21, 24
See application file for complete search history.

(56) References Cited
U.S. PATENT DOCUMENTS
6,775,618 B1 8/2004 Robertsson et al.
7,068,568 B2 6/2006 Robertsson
2008/0089174 A1* 4/2008 Sollner et al. .............. 367/21

FOREIGN PATENT DOCUMENTS
GB 2 414 299 11/2005
WO WO 2005/114258 12/2005

OTHER PUBLICATIONS
Mallat and Zhang, "Matching pursuits with time-frequency dictionaries," *IEEE Trans on Signal Processing*, 41(12):3397-3415, 1993.
Robertsson and Kragh, "Rogh-sea deghosting using a single streamer and a pressure gradient approximation," *Geophysics*, 67(6):2005-2011, 2002.

* cited by examiner

*Primary Examiner*—Bryan Bui (57) ABSTRACT

A technique includes obtaining particle motion data and pressure data that are acquired by seismic sensors while in tow. The sensors are part of a plurality of streamers, and the pressure and particle motion data contain surface ghosts. The technique includes processing the particle motion data and the pressure data to generate a data set that is indicative of a pressure wavefield at positions between the streamers and is substantially free of the surface ghosts.

34 Claims, 5 Drawing Sheets

INTERPOLATING AND DEGHOSTING MULTI-COMPONENT SEISMIC SENSOR DATA

BACKGROUND

The invention generally relates to interpolating and deghosting multi-component seismic sensor data.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes obtaining particle motion data and pressure data that are acquired by seismic sensors while in tow. The sensors are part of a plurality of streamers, and the pressure and particle motion data contain surface ghosts. The technique includes processing the particle motion data and the pressure data to generate a data set that is indicative of a pressure wavefield at positions between the streamers and is substantially free of the surface ghosts.

In another embodiment of the invention, a system includes an interface and a processor. The interface receives particle motion data and pressure data, which are acquired by seismic sensors while in tow. The sensors are part of a plurality of streamers, and the pressure and particle motion data contain surface ghosts. The processor processes the particle motion data and pressure data to generate a data set that is indicative of a pressure wavefield at positions between the streamers and is substantially free of the surface ghosts.

In yet another embodiment of the invention, an article that includes a computer accessible storage medium stores instructions that when executed cause a processor-based system to obtain particle motion data and pressure data that are acquired by seismic sensors while in tow. The sensors are part of a plurality of streamers, and the pressure and particle motion data contain surface ghosts. The instructions when executed cause the processor-based system to process the particle motion data and the pressure data to generate a data set that is indicative of a pressure wavefield at positions between the streamers and is substantially free of the surface ghosts.

Advantages and other features of the invention will become apparent from the following drawing, description and claims.

DETAILED DESCRIPTION

Figure 1:
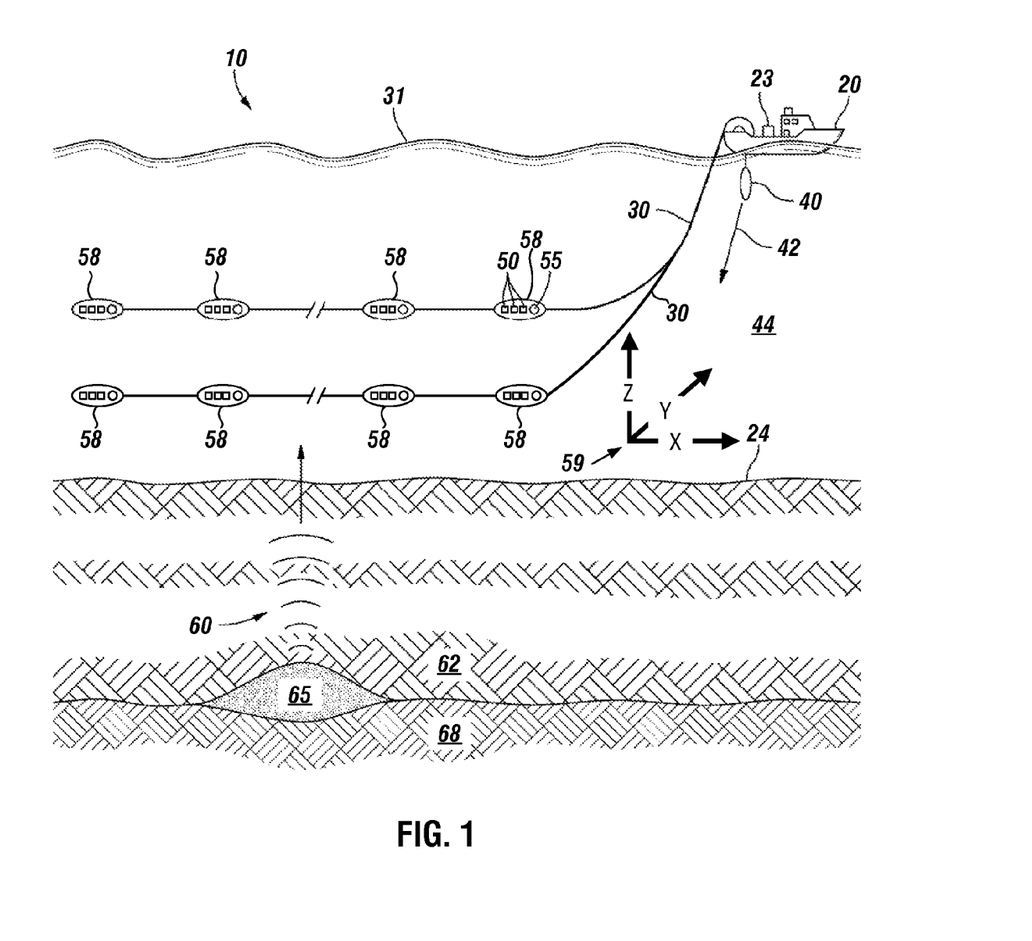
FIG. 1 is a schematic diagram of a marine seismic data acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (two exemplary streamers 30 being depicted in FIG. 1) behind the vessel 20. The seismic streamers 30 may be several thousand meters long and may contain various support cables (not shown), as well as wiring and/or circuitry (not shown) that may be used to support communication along the streamers 30.

Each seismic streamer 30 contains seismic sensors, which record seismic signals. In accordance with some embodiments of the invention, the seismic sensors are multi-component seismic sensors 58, each of which is capable of detecting a pressure wavefield and at least one component of a particle motion that is associated with acoustic signals that are proximate to the multi-component seismic sensor 58. Examples of particle motions include one or more components of a particle displacement, one or more components (inline (x), cross-line (y) and vertical (z) components (see axes 59, for example)) of a particle velocity and one or more components of a particle acceleration.

Depending on the particular embodiment of the invention, the multi-component seismic sensor 58 may include one or more hydrophones, geophones, particle displacement sensors, particle velocity sensors, accelerometers, or combinations thereof.

For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the multi-component seismic sensors 58. It is noted that the pressure waves that are received and sensed by the multi-component seismic sensors 58 include "up going" pressure waves that propagate to the sensors 58 without reflection, as well as "down going" pressure waves that are produced by reflections of the pressure waves 60 from an air-water boundary 31.

The multi-component seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wavefield by its hydrophone 55; and the sensor 58 may provide one or more traces that correspond to one or more components of particle motion, which are measured by its accelerometers 50.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 320 that is depicted in FIG. 19 and is further described below) that may be, for example, located on land or on the vessel 20. Thus, many variations are possible and are within the scope of the appended claims.

The down going pressure waves create an interference known as "ghost" in the art. Depending on the incidence angle of the up going wavefield and the depth of the streamer 30, the interference between the up going and down going wavefields creates nulls, or notches, in the recorded spectrum. These notches may reduce the useful bandwidth of the spectrum and may limit the possibility of towing the streamers 30 in relatively deep water (water greater than 20 meters (m), for example).

The technique of decomposing the recorded wavefield into up and down going components is often referred to as wavefield separation, or "deghosting." The particle motion data set that is provided by the multi-component seismic sensors 58 allows the recovery of "ghost" free data, which means data that are indicative of the upgoing wavefield.

In addition to providing the ability to remove surface ghosts, the multi-component data set also permits the interpolation of the pressure data in the cross-line direction (i.e., along the y axis) by using the fact that the cross-line component of the particle velocity (called "$V_y$") is proportional to the cross-line gradient of the pressure (P). Exemplary techniques of using multi-component seismic data for purposes of cross-line interpolation are described in PCT Publication No. WO 2005/114258 A1 entitled, "INTERPOLATION AND EXTRAPOLATION METHOD FOR SEISMIC RECORDINGS," which was published on Dec. 1, 2005.

In accordance with embodiments of the invention, techniques are disclosed herein for obtaining ghost-free interpolated data. More specifically, two different types of techniques are described herein for purposes of obtaining the interpolated, ghost-free data: a first technique to cross-line interpolate deghosted data; and a second technique to deghost cross-line interpolated data.

Figure 2:
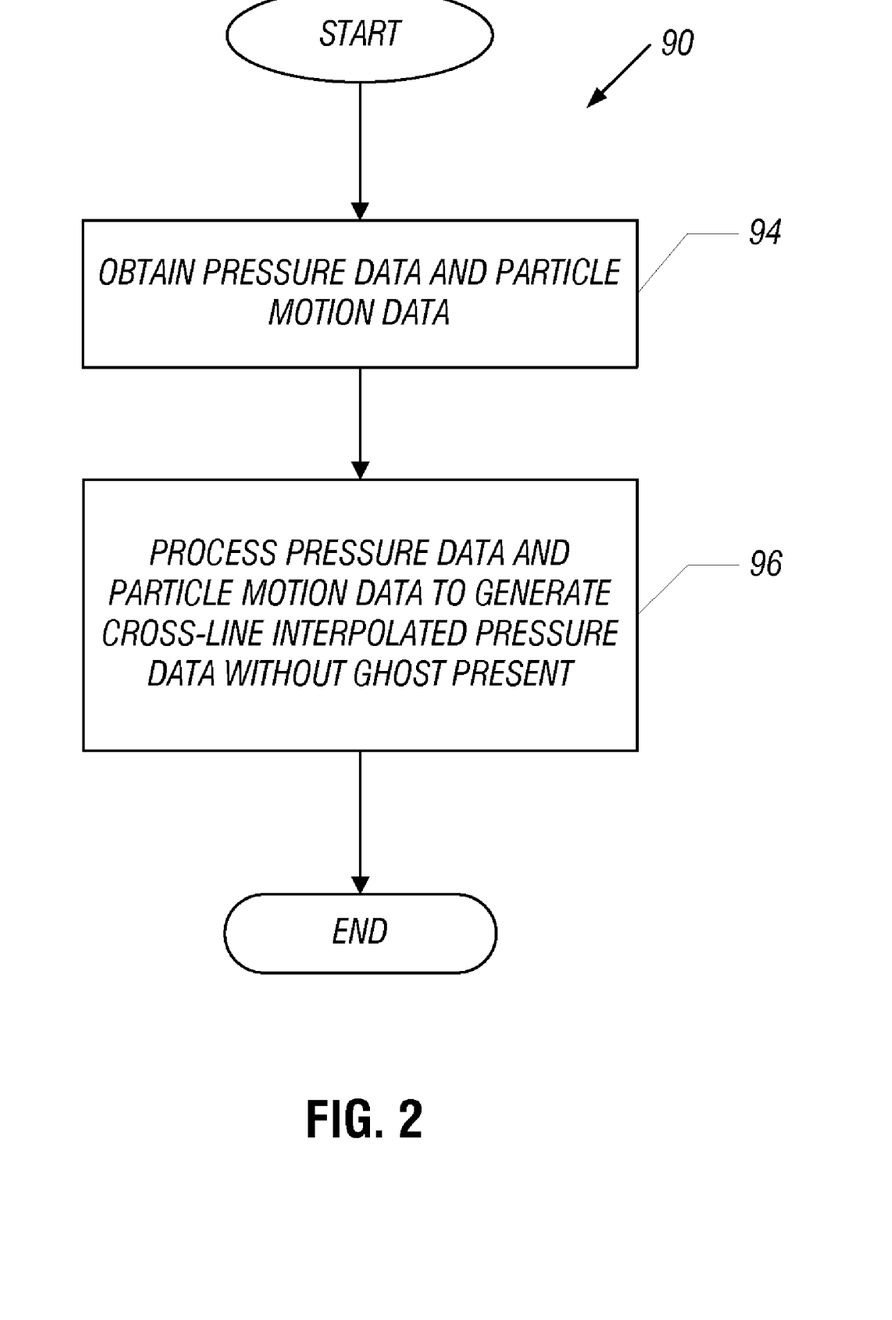
FIGS. 2, 3 and 4 are flow diagrams in accordance with embodiments of the invention depicting techniques to provide interpolated pressure data along a cross-line direction, which is substantially free of surface ghosts.

Referring to FIG. 2, thus, in accordance with embodiments of the invention described herein, a technique 90 includes obtaining (block 94) pressure data and particle motion data, which were acquired by multicomponent seismic sensors while in tow. It is noted that the seismic sensors are located on multiple streamers 30 (see FIG. 1). Although the pressure and particle motion data contain surface ghosts, the pressure data and particle motion data are processed (block 96) to generate cross-line interpolated pressure data, which are substantially free of surface ghosts.

In the following discussion, the pressure data (called "P") are the data collected from such sensors as hydrophones; and the particle motion data are the data collected from such sensors as geophones (or accelerometers) and are referred to in terms of the three components of the particle velocity: an inline component (called "$V_x$"); a cross-line component (called "$V_y$"); and a vertical component (called "$V_z$"). Likewise, for the case of accelerometers, the particle motion data indicate the three components of particle accelerations: $a_x$, $a_y$, and $a_z$. As depicted by the axes 59 in FIG. 1, the vertical, or z, direction points in an upward direction toward the sea surface; the x, or inline, direction is in line with the streamer 30; and the y, or cross-line, direction is orthogonal to and located in the same plane as the x axis.

Figure 3:
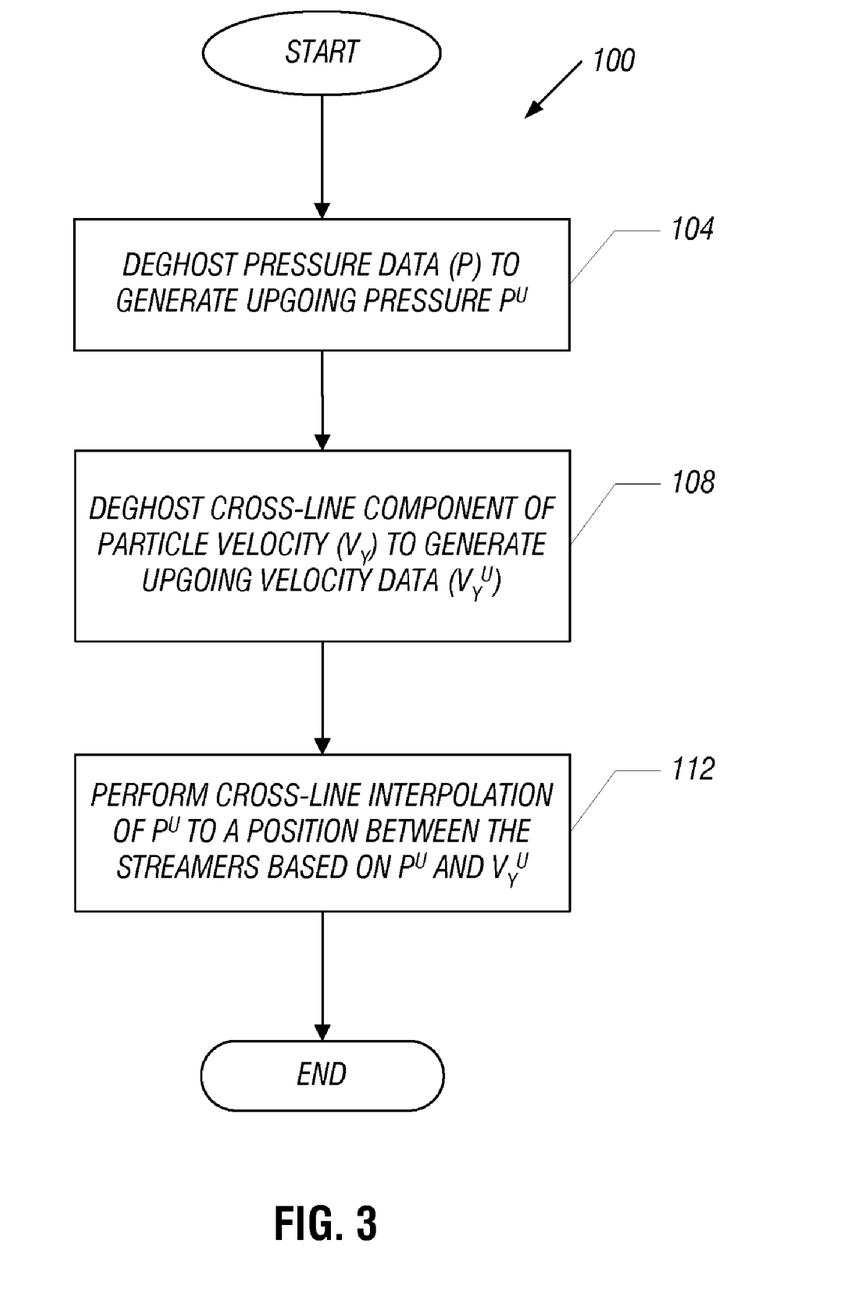

The first technique described herein is a technique 100 (see FIG. 3) to cross-line interpolate deghosted data, pursuant to FIG. 3. Referring to FIG. 3, the technique 100 includes deghosting the P pressure data to generate upgoing pressure data (herein called the "$P^U$ data"), pursuant to block 104. The $V_y$ velocity data are also deghosted (block 108) to generate upgoing cross-line component of the particle velocity data (herein called the "$V_y^U$ data"). Cross-line interpolation of the $P^U$ pressure data is performed, pursuant to block 112, to a position between the streamers based on the $P^U$ and $V_y^U$ data to produce cross-line interpolated pressure data, called the "$\hat{P}^U$ data," which are substantially free of surface ghosts.

Turning to the more specific details, in accordance with some embodiments of the invention, one out of a number of potential available techniques may be used for deghosting the P pressure data. For example, in accordance with some embodiments of the invention, a deghosting technique that is described in U.S. Pat. No. 6,775,618, entitled "METHOD AND SYSTEM FOR REDUCING EFFECTS OF SEA SURFACE GHOST CONTAMINATION IN SIESMIC DATA," which granted on Aug. 10, 2004, may be used.

For purposes of deghosting the $V_y$ velocity (i.e., block 108 of the technique 100), the ghost operator that is applied to the $V_y$ velocity may be identical to the corresponding operator for the P data, as described below:

$$V_y^U = \frac{1}{1 - e^{-2ik_z d}} V_y, \qquad \text{Eq. 1}$$

where "d" represents the depth of the streamer below the sea surface and "$k_z$" is the following:

$$k_z = \sqrt{(\omega/c)^2 - k_x^2 - k_y^2}. \qquad \text{Eq. 2}$$

In Eq. 2, the symbol "$\omega$" represents the angular frequency, and "c" represents the speed of the velocity in water. Because the cross-line wavenumber $k_y$ is unknown, it may be assumed to be zero; or alternatively, projections may be made onto a fictitious source-receiver line to account for propagation effects in a plane layered Earth, as is performed in the deghosting of the P pressure data. For small to moderate cross-line angles of incidence, the assumption of $k_y$ being equal to zero may be sufficient to at least a first approximation.

After the deghosting of the P pressure and $V_y$ data, to provide the $P^U$ and $V_y^U$ data, the cross-line interpolation may be performed, as set forth below, using a weighted combination of the pressure and gradient data.

To generalize, the following discusses the cross-line interpolation of a function called "f(x)" (which is the pressure wavefield for the specific application disclosed herein). In general, the function f(x) may be represented by a sum of J sinusoids with amplitudes $A_j$, wavenumbers $k_j$ and phases $\phi_j$:

$$f(x) = \sum_{j=1}^{J} A_j \cos(2\pi k_j x + \phi_j). \qquad \text{Eq. 3}$$

To identify the parameters of the sinusoids an algorithm called the "Matching Pursuit" algorithm may be used. The Matching Pursuit algorithm is generally disclosed in Mallat, S. G. and Zhang Z., 1993, Matching Pursuits With Time-Frequency Dictionaries, IEEE Trans. On Signal Processing, 41, 3397-3415. This is an iterative algorithm, which is used to expand a signal in terms of a linear combination of a set of waveforms. The set of waveforms used in the representation form a redundant dictionary. In other words, there are more terms in the dictionary than needed for an adequate representation. According to this model of the seismic data, the dictionary in this study consists of a set of sinusoids. The frequencies, amplitudes and phases of sinusoids are to be determined iteratively by using the Matching Pursuit algorithm. At every iteration a new sinusoid is added to the model and then the modeling error waveform, i.e., the residual, is obtained. The parameters of the sinusoid added to the model are found by optimization by minimizing the energy of the residual. Thus, if P−1 components are determined previously, the representation of the seismic data with only P−1 sinusoids may be described as follows:

$$f^{P-1}(x) = \sum_{j=1}^{P-1} A_j \cos(2\pi k_j x + \phi_j). \qquad \text{Eq. 4}$$

The residual in the approximation may be described as follows:

$$r^{P-1}(x) = f(x) - \sum_{j=1}^{P-1} A_j \cos(2\pi k_j x + \phi_j). \qquad \text{Eq. 5}$$

If a new expression $A_P \cos(2\pi k_P x + f_P)$ is added to the model, then the residual becomes the following:

$$r^{P-1}(x) = r^{P-1}(x) - A_P \cos(2\pi k_P x + \phi_P). \qquad \text{Eq. 6}$$

Parameters of the new expression may be found by minimizing the energy of the residual on irregular offset locations as described below:

$$(A_P, k_P, \phi_P) = \arg \min_{A_P, k_P, \phi_P} \sum_{k=1}^{L} |r^{P-1}(x) - \overline{A}_P \cos(2\pi k_P x + \phi_P)|^2. \qquad \text{Eq. 7}$$

If the new model is expressed as:

$$\overline{A}_P \cos(2\pi \overline{k}_P x_k + \phi_P) = \overline{a}_P \cos(2\pi \overline{k}_P x_k) + \overline{b}_P \sin(2\pi \overline{k}_P x_k), \qquad \text{Eq. 8}$$

where $\overline{a}_p$ and $\overline{b}_p$ are defined by $$\overline{A}_P = (\overline{a}_P^2 + \overline{b}_P^2)^{1/2}, \; \overline{\phi}_P = -\tan^{-1}(\overline{b}_P / \overline{a}_P), \qquad \text{Eq. 9}$$

then the cost function becomes linear in $\overline{a}_p$ and $\overline{b}_p$:

$$(a_P, b_P, k_P) = \qquad \text{Eq. 10}$$
$$\arg \min_{\overline{A}_P, \overline{k}_P, \overline{\phi}_P} \sum_{k=1}^{L} |r^{P-1}(x_k) - \overline{a}_P \cos(2\pi \overline{k}_P x_k) - \overline{b}_P \sin(2\pi \overline{k}_P x_k)|^2.$$

Hence, sinusoid parameters $\overline{a}_p$ and $\overline{b}_p$ which minimizes the above expression can be solved in terms of the wavenumber $\overline{k}_P$ as follows:

$$\begin{bmatrix} a_p(\overline{k}_P) \\ b_p(\overline{k}_P) \end{bmatrix} = D_P^{-1}(\overline{k}_P) d_P(\overline{k}_P), \qquad \text{Eq. 11}$$

where the 2-by-2 matrix $D_P(\overline{k}_p)$ and 2-by-1 vector $d_P(\overline{k}_p)$ are defined in terms of the wavenumber $\overline{k}_p$ as follows:

$$D_P(\overline{k}_p) = \begin{bmatrix} \sum_{k=1}^{L} \cos^2(2\pi \overline{k}_p x_k) & \sum_{k=1}^{L} \sin(4\pi \overline{k}_p x_k)/2 \\ \sum_{k=1}^{L} \sin(4\pi \overline{k}_p x_k)/2 & \sum_{k=1}^{L} \sin^2(2\pi \overline{k}_p x_k) \end{bmatrix}, \text{ and} \qquad \text{Eq. 12}$$

$$d_P(\overline{k}_p) = \begin{bmatrix} \sum_{k=1}^{L} r^{P-1}(x_k) \cos(2\pi \overline{k}_p x_k) \\ \sum_{k=1}^{L} r^{P-1}(x_k) \sin(2\pi \overline{k}_p x_k) \end{bmatrix}. \qquad \text{Eq. 13}$$

Once the optimal value of $\overline{a}_p$ and $\overline{b}_p$ are substituted into Eq. 10, the optimization problems simplifies to the following:

$$k_P = \arg \min_{\overline{k}_P} \left\{ \sum_{k=1}^{L} |r^{P-1}(x_k)|^2 - g_P^T(\overline{k}_P) G_P^{-1}(\overline{k}_P) g_P(\overline{k}_P) \right\}, \qquad \text{Eq. 14}$$

which can be alternatively posed as a maximization problem:

$$k_P = \arg \min_{\overline{k}_P} \{ g_P^T(\overline{k}_P) G_P^{-1}(\overline{k}_P) g_P(\overline{k}_P) \}. \qquad \text{Eq. 15}$$

It can be shown that the objective function $g_P^T(\overline{k}_p) G_P^{-1}(\overline{k}_p) g_P(\overline{k}_p)$ is the same as the Lomb spectrum, which is widely used especially in astronomy to compute the spectrum of non-uniformly sampled time-series. Thus, the wavenumber $\bar{k}_P$ is estimated by computing the Lomb spectrum and choosing the wavenumber corresponding to the largest peak.

Since the Lomb spectrum provides a fairly good estimate of the dominant peak locations, it is conceivable to estimate several dominant wavenumbers by Eq. 15 and use these dominant wavenumbers to identify parameters of several sinusoidal components by using Eq. 11. As several sinusoidal components would be identified at each iteration, the convergence rate of the algorithm would be significantly improved with negligible increase in the computational complexity. The same wavenumber can be identified as a dominant peak at later iterations; therefore any error introduced by this type of an approach can be corrected at later stages.

For purposes of interpolating the gradient data, the gradient may be described as follows:

$$f'(x) = \sum_{j=1}^{J} A_j 2\pi k_j \sin(2\pi k_j x + \phi_2). \quad \text{Eq. 16}$$

Because there are two sets of measurements, it is conceivable to determine the model parameters by minimizing a mixture of fit errors to both sets of measurements. For instance, if the parameters of the sinusoids up to order P−1 are determined, then the parameters of the sinusoid of order P can be determined by minimizing a weighted sum of the residual energies for data and gradient as described below:

$$(A_P, k_P, \phi_P) = \quad \text{Eq. 17}$$
$$\arg\min_{\bar{A}_P, \bar{k}_P, \bar{\phi}_P} \left\{ \sum_{k=1}^{L} \left| r^{P-1}(x_k) - \bar{A}_P \cos(2\pi \bar{k}_P x_k + \bar{\phi}_P) \right|^2 + \right.$$
$$\left. \sum_{k=1}^{L} \left| (r^{P-1})'(x_k) + \bar{A}_P 2\pi \bar{k}_P \sin(2\pi \bar{k}_P x_k + \bar{\phi}_P) \right|^2 \right\},$$

where "$\bar{A}_P \cos(2p\bar{k}_P x_k + \bar{l}_P)$" is the new model term, "$(r^{P-1})\phi(x)$" is the gradient of the residual given in Eq. 15 and 1 is weighting parameter which also accounts for difference of units between data and gradient measurements. If the new model term is expressed as shown in Eq. 8, then the model parameters $\bar{a}_p$ and $\bar{b}_p$ are obtained as follows:

$$\begin{bmatrix} a_P(\bar{k}) \\ b_P(\bar{k}_P) \end{bmatrix} = (D_P(k_P) + \lambda G_P(\bar{k}_P))^{-1} (d_P(k_P) + \lambda g_P(\bar{k}_P)), \quad \text{Eq. 18}$$

where $D_P(\bar{k}_P)$, $d_P(\bar{k}_P)$ are given in Eqs. 12 and 13, and $G_P(\bar{k}_P)$, $g_P(\bar{k}_P)$ are defined in terms of the wavenumber $\bar{k}_P$ as follows:

$$G_P(\bar{k}_P) = \begin{bmatrix} 4\pi^2 \bar{k}_P^2 \sum_{k=1}^{L} \sin^2(2\pi \bar{k}_P x_k) & -2\pi^2 \bar{k}_P^2 \sum_{k=1}^{L} \sin(4\pi \bar{k}_P x_k) \\ -2\pi^2 \bar{k}_P^2 \sum_{k=1}^{L} \sin(4\pi \bar{k}_P x_k)/2 & 4\pi^2 \bar{k}_P^2 \sum_{k=1}^{L} \cos^2(2\pi \bar{k}_P x_k) \end{bmatrix}, \quad \text{Eq. 19}$$

$$g_P(\bar{k}_P) = \begin{bmatrix} -2\pi^2 \bar{k}_P^2 \sum_{k=1}^{L} r^{P-1}(x_k) \sin(2\pi \bar{k}_P x_k) \\ 2\pi^2 \bar{k}_P^2 \sum_{k=1}^{L} (r^{P-1})'(x_k) \cos(2\pi \bar{k}_P x_k) \end{bmatrix}. \quad \text{Eq. 20}$$

Thus, substituting $\bar{a}_p$ and $\bar{b}_p$ into Eq. 16 and simplifying the resulting equation, the 3-Dimensional minimization problem in Eq. 16 can be transformed into a 1-Dimensional maximization problem as described below:

$$k_P = \arg\max_{\bar{k}_P} \left\{ (d_P(\bar{k}_P) + \lambda g_P(\bar{k}_P))^T \right. \quad \text{Eq. 21}$$
$$\left. (D_P(\bar{k}_P) + \lambda G_P(\bar{k}_P))^{-1} (d_P(\bar{k}_P) + \lambda g_P(\bar{k}_P)) \right\},$$

This problem is non-linear in $\bar{k}_P$. Therefore, the wavenumber domain may be searched to find the optimal $\bar{k}_P$. Note that computation of the objective function given in Eq. 21 has the same order of complexity as that for non-uniform Fourier transform.

As an alternative, the techniques described herein for obtaining ghost-free cross-line interpolated pressure data may alternatively involve deghosting interpolated data, as opposed to interpolating deghosted data. More specifically, referring to FIG. 4, in accordance with some embodiments of the invention, a technique 150 includes interpolating (block 154) P pressure data in the cross-line direction without first deghosting the P pressure data. The interpolation of the pressure data produces interpolated pressure data (called "$\hat{P}$"). Next, the $V_z$ particle velocity is interpolated (block 158) to generate interpolated velocity data (called "$\hat{V}_z$"). The $\hat{P}$ interpolated pressure data are then deghosted, pursuant to block 162, to generate deghosted and interpolated pressure data (called "$\hat{P}^U$").

Figure 4:
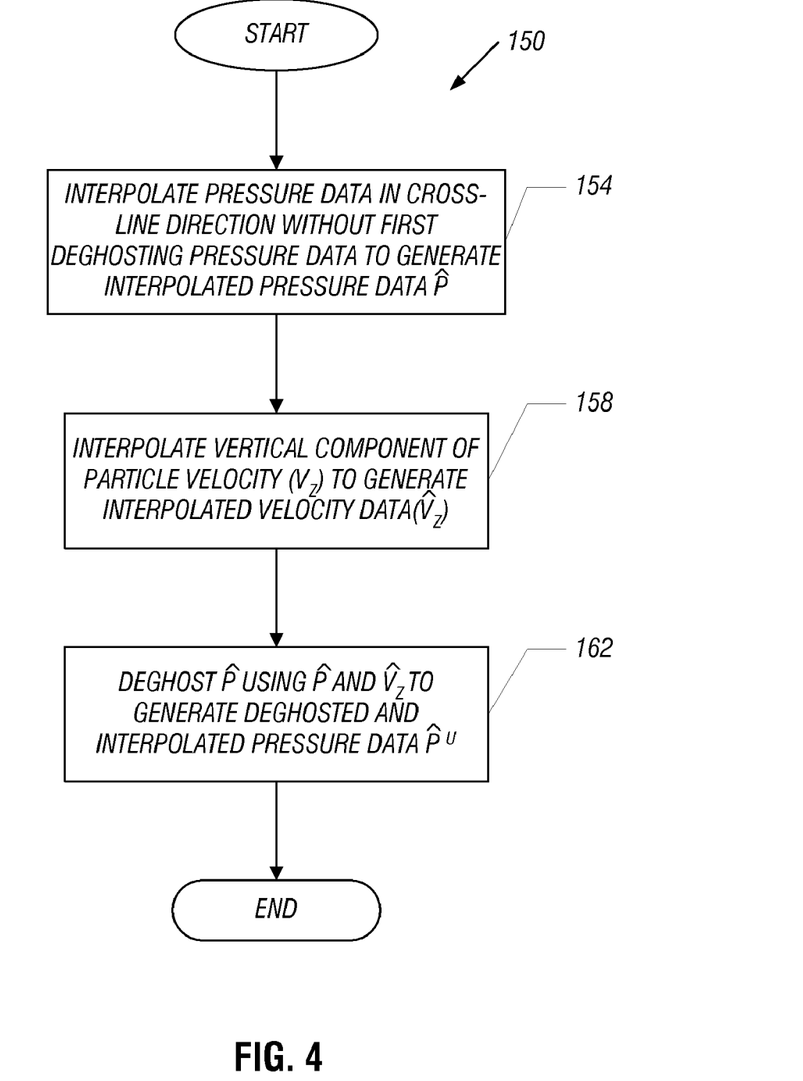

Turning to the more specific details of the technique 150, the cross-line interpolation of the P pressure data may be performed using Eqs. 3-21, as described above. This interpolation produces the P pressure data at an intermediate position between the streamers.

For purposes of the cross-line interpolation of the $V_z$ velocity, the $V_z$ data may not as easily be interpolated in the cross-line direction because of the lack of knowledge of the cross-line gradient of the $V_z$ velocity. One way to cross-line interpolate the $V_z$ data is to revert to the single component interpolation, which is set forth above in Eqs. 3-15. A single component interpolation technique may require closer streamer separation to avoid aliasing problems.

It is also noted that the curl of the wavefield is zero in an acoustic medium, which yields the following relationship:

$$\frac{\partial V_z}{\partial y} = \frac{\partial V_y}{\partial z}. \qquad \text{Eq. 20}$$

Therefore, if an estimate is made of "$\partial V_y/\partial z$," the above-described approach may be used to interpolate the $V_z$ velocity in the cross-line direction to an intermediate location and obtain $\hat{V}_z$. It is noted that it may also be possible to obtain an estimate for $\partial V_y/\partial z$ using a single streamer deghosting method similar to the Lax-Wendroff technique that is set forth in U.S. Pat. No. 7,068,568, entitled "Method Of Processing Seismic Data," which granted on Jun. 27, 2006 and in U.S. Pat. No. 6,775,618, entitled "Method And System For Reducing Effects Of Sea Surface Ghost Contamination In Seismic Data," which granted on Aug. 10, 2004.

Regarding the deghosting of the $\hat{P}$ interpolated pressure data, pursuant to block 162, any of the techniques for deghosting the $\hat{P}$ data may be used, such as the technique described in U.S. Pat. No. 6,775,618.

Figure 5:
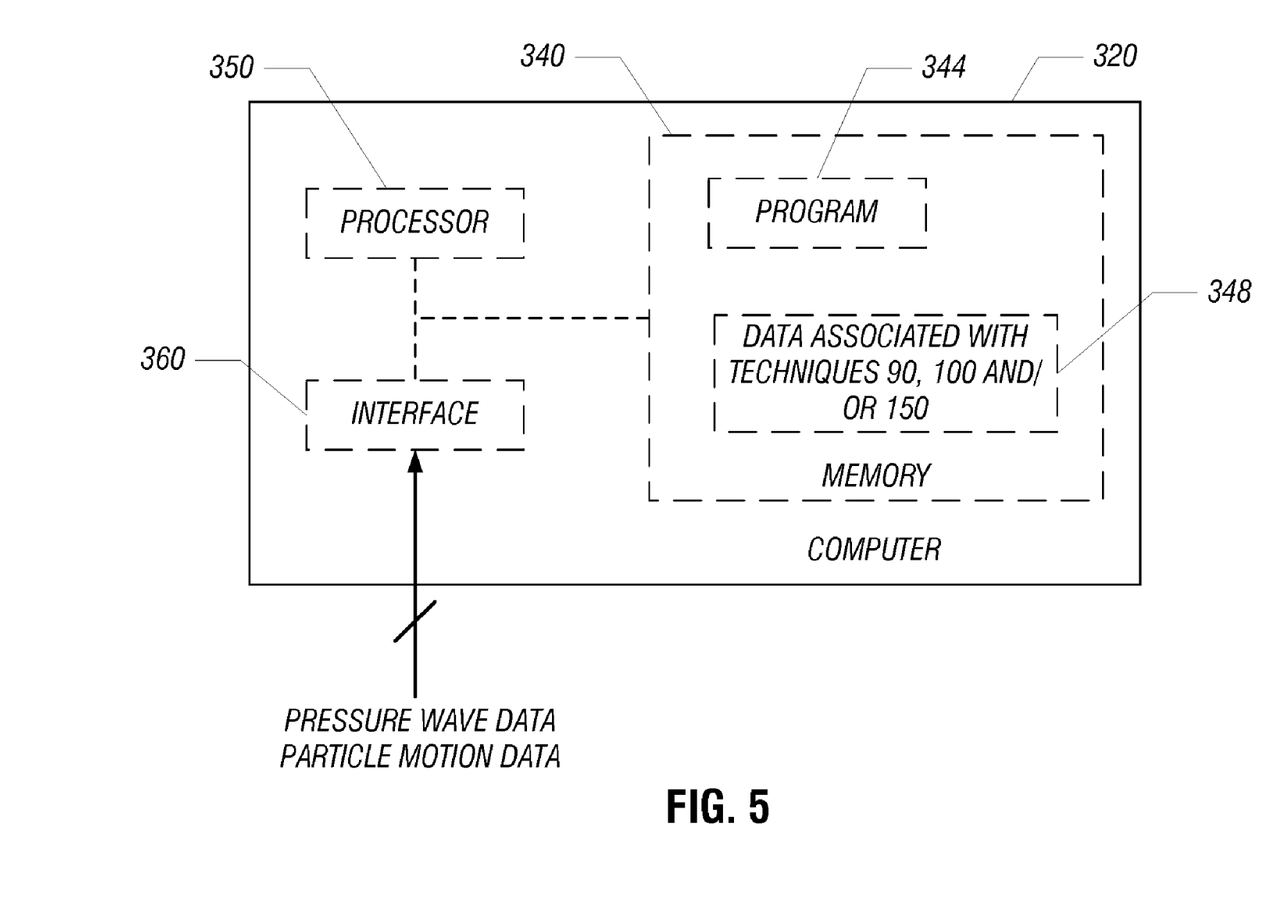
FIG. 5 is a schematic diagram of a seismic data processing system according to an embodiment of the invention.

Referring to FIG. 5, in accordance with some embodiments of the invention, a seismic data processing system 320 may perform the techniques disclosed herein for providing ghost-free interpolated pressure data along the cross-line direction. In accordance with some embodiments of the invention, the system 320 may include a processor 350, such as one or more microprocessors and/or microcontrollers. The processor 350 may be located on a streamer 30 (FIG. 1), located on the vessel 20 or located at a land-based processing facility (as examples), depending on the particular embodiment of the invention.

The processor 350 may be coupled to a communication interface 360 for purposes of receiving seismic data that corresponds to pressure and particle motion measurements. Thus, in accordance with embodiments of the invention described herein, the processor 350, when executing instructions stored in a memory of the seismic data processing system 320, may receive a multi-component data set that is acquired by multi-component seismic sensors while in tow. It is noted that, depending on the particular embodiment of the invention, the multi-component data may be data that are directly received from the multi-component seismic sensor as the data are being acquired (for the case in which the processor 350 is part of the survey system, such as part of the vessel or streamer) or may be multi-component data that were previously acquired by the seismic sensors while in tow and stored and communicated to the processor 350, which may be in a land-based facility, for example.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the seismic data processing system 320 and may store, for example, various data sets involved with the techniques 90, 100 and/or 150, as indicated by reference numeral 348. The memory 340 may store program instructions 344, which when executed by the processor 350, may cause the processor 350 to perform one or more of the techniques that are disclosed herein, such as the techniques 90, 100 and/or 150 (as examples) and display results obtained via the technique(s) on a display (not shown in FIG. 5) of the system 320, in accordance with some embodiments of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:

obtaining particle motion data and pressure data acquired by seismic sensors while in tow, the sensors being part of a plurality of streamers and the pressure and particle motion data containing surface ghosts; and processing the particle motion data and pressure data to generate a data set that is indicative of a pressure wavefield at positions between the streamers and is substantially free of the surface ghosts.

2. The method of claim 1, wherein the act of processing comprises:

processing the pressure data to substantially remove the surface ghosts to generate deghosted pressure data; and interpolating the deghosted pressure data to generate the data set.

3. The method of claim 2, wherein the direction of towing defines an inline direction, and the act of interpolating comprises interpolating the deghosted pressure data along a cross-line direction that is substantially orthogonal to the inline direction.

4. The method of claim 1, wherein the act of processing comprises:

processing the pressure data to generate interpolated pressure data, the interpolated pressure data containing surface ghosts; and processing the interpolated pressure data to substantially remove the surface ghosts from the interpolated pressure data to generate the data set.

5. The method of claim 4, wherein the particle motion data comprises vertical particle motion data indicative of vertical particle motion, the method further comprising interpolating the vertical particle motion data to generate interpolated vertical particle motion data, wherein the act of processing the interpolated pressure data comprises using the interpolated vertical particle motion data.

6. The method of claim 5, wherein the direction of towing defines an inline direction, and the act of interpolating the vertical particle motion data comprises interpolating the vertical particle motion data along a cross-line direction that is substantially orthogonal to the inline direction.

7. The method of claim 4, wherein the direction of towing defines an inline direction, and the act of processing the pressure data to generate interpolated pressure data comprises interpolating the pressure data along a cross-line direction that is substantially orthogonal to the inline direction.

8. The method of claim 1, further comprising:

determining the pressure gradient data from the particle motion data; and using the pressure gradient data to interpolate the pressure data to generate the data set.

9. A system comprising:

an interface to receive particle motion data and pressure data acquired by seismic sensors while in tow, the sensors being part of a plurality of streamers and the pressure and particle motion data containing surface ghosts; and a processor to process the particle motion data and pressure data to generate a data set that is indicative of a pressure wavefield at positions between the streamers and is substantially free of the surface ghosts.

10. The system of claim 9, further comprising:
a vessel to tow the streamers.

11. The system of claim 9, wherein the processor is located in a streamer which contains at least one of the seismic sensors.

12. The system of claim 9, wherein the processor is located on a vessel that tows the streamers.

13. The system of claim 6, wherein the processor is adapted to:
process the pressure data to substantially remove the surface ghosts to generate deghosted pressure data; and
interpolate the deghosted pressure data to generate the data set.

14. The system of claim 13, wherein the direction of towing defines an inline direction, and the processor is adapted to interpolate the deghosted pressure data along a cross-line direction that is substantially orthogonal to the inline direction.

15. The system of claim 9, wherein the processor is adapted to:
process the pressure data to generate interpolated pressure data, the interpolated pressure data containing surface ghosts; and
process the interpolated pressure data to substantially remove the surface ghosts from the interpolated pressure data to generate the data set.

16. The system of claim 15, wherein the particle motion data comprises vertical particle motion data indicative of vertical particle motion, and the processor is adapted to interpolate the vertical particle motion data to generate interpolated vertical particle motion data.

17. The system of claim 16, wherein the direction of towing defines an inline direction, and the processor is adapted to interpolate the vertical particle motion data along a cross-line direction that is substantially orthogonal to the inline direction.

18. The system of claim 15, wherein the direction of towing defines an inline direction, and the processor is adapted to interpolate the pressure data along a cross-line direction that is substantially orthogonal to the inline direction.

19. The system of claim 9, wherein the processor is adapted to determine pressure gradient data from the particle motion data and use the pressure gradient data to interpolate the pressure data to generate the data set.

20. An article comprising a computer accessible storage medium storing instructions that when executed cause a processor-based system to:
obtain particle motion data and pressure data acquired by seismic sensors while in tow, the sensors being part of a plurality of streamers and the pressure and particle motion data containing surface ghosts; and
process the particle motion data and pressure data to generate a data set that is indicative of a pressure wavefield at positions between the streamers and is substantially free of the surface ghosts.

21. The article of claim 20, the storage medium storing instructions to when executed cause the processor-based system to:
process the pressure data to substantially remove the surface ghosts to generate deghosted pressure data; and
interpolate the deghosted pressure data to generate the data set.

22. The article of claim 21, wherein the direction of towing defines an inline direction, and the storage medium storing instructions to when executed cause the processor-based system to interpolate the deghosted pressure data along a cross-line direction that is substantially orthogonal to the inline direction.

23. The article of claim 20, the storage medium storing instructions to when executed cause the processor-based system to:
process the pressure data to generate interpolated pressure data, the interpolated pressure data containing surface ghosts; and
process the interpolated pressure data to substantially remove the surface ghosts from the interpolated pressure data to generate the data set.

24. The article of claim 23, wherein the particle motion data comprises vertical particle motion data indicative of vertical particle motion, the storage medium storing instructions to when executed cause the processor-based system to interpolate the vertical particle motion data to generate interpolated vertical particle motion data.

25. The article of claim 24, wherein the direction of towing defines an inline direction, and the storage medium storing instructions to when executed cause the processor-based system to interpolate the vertical particle motion data along a cross-line direction that is substantially orthogonal to the inline direction.

26. The article of claim 23, wherein the direction of towing defines an inline direction, and the storage medium storing instructions to when executed cause the processor-based system to interpolate the pressure data along a cross-line direction that is substantially orthogonal to the inline direction.

27. The article of claim 20, the storage medium storing instructions to when executed cause the processor-based system to determine a pressure gradient from the particle motion data and use the pressure gradient to interpolate the pressure data to generate the data set.

28. A method comprising:
obtaining particle motion data and pressure data acquired by seismic sensors while in tow, the sensors being part of a plurality of streamers and the pressure and particle motion data containing surface ghosts, a direction of towing defining an inline direction; and
processing the particle motion data and pressure data to generate a data set that is indicative of a pressure wavefield at positions between the streamers and is substantially free of the surface ghosts, the processing comprising:
processing the pressure data to substantially remove the surface ghosts to generate deghosted pressure data;
interpolating the deghosted pressure data to generate the data set;
determining pressure gradient data from the particle motion data;
deghosting the pressure gradient data to generate deghosted pressure gradient data; and
using the deghosted pressure gradient data to interpolate the deghosted pressure data to generate the data set.

29. The method of claim 28, wherein the act of processing further comprises:
processing the pressure data to generate interpolated pressure data, the interpolated pressure data containing surface ghosts; and
processing the interpolated pressure data to substantially remove the surface ghosts from the interpolated pressure data to generate the data set.

30. The method of claim 29, wherein the particle motion data comprises vertical particle motion data indicative of vertical particle motion, the method further comprising:
  interpolating the vertical particle motion data to generate interpolated vertical particle motion data,
  wherein the act of processing the interpolated pressure data comprises using the interpolated vertical particle motion data.

31. The method of claim 30, wherein the direction of towing defines an inline direction, and the act of interpolating the vertical particle motion data comprises interpolating the vertical particle motion data along a cross-line direction that is substantially orthogonal to the inline direction.

32. The method of claim 29, wherein the direction of towing defines an inline direction, and the act of processing the pressure data to generate interpolated pressure data comprises interpolating the pressure data along a cross-line direction that is substantially orthogonal to the inline direction.

33. A system comprising:
  an interface to receive particle motion data and pressure data acquired by seismic sensors while in tow, the sensors being part of a plurality of streamers and the pressure and particle motion data containing surface ghosts; and
  a processor to process the particle motion data and pressure data to generate a data set that is indicative of a pressure wavefield at positions between the streamers and is substantially free of the surface ghosts, the processor adapted to:
    process the pressure data to substantially remove the surface ghosts to generate deghosted pressure data;
    interpolate the deghosted pressure data to generate the data set;
    determine pressure gradient data from the particle motion data;
    deghost the pressure gradient data to generate deghosted pressure gradient data; and
    use the deghosted pressure gradient data to interpolate the deghosted pressure data to generate the data set.

34. An article comprising a computer accessible storage medium storing instructions that when executed cause a processor-based system to:
  obtain particle motion data and pressure data acquired by seismic sensors while in tow, the sensors being part of a plurality of streamers and the pressure and particle motion data containing surface ghosts;
  process the particle motion data and pressure data to generate a data set that is indicative of a pressure wavefield at positions between the streamers and is substantially free of the surface ghosts, process the pressure data to substantially remove the surface ghosts to generate deghosted pressure data;
  interpolate the deghosted pressure data to generate the data set;
  determine pressure gradient data from the particle motion data;
  deghost the pressure gradient data to generate deghosted pressure gradient data; and
  use the deghosted pressure gradient data to interpolate the deghosted pressure data to generate the data set.

* * * * *